F. L. RAPSON.
LIFTING JACK AND THE LIKE FOR USE ON MOTOR ROAD AND OTHER VEHICLES.
APPLICATION FILED DEC. 22, 1917.

1,350,036.

Patented Aug. 17, 1920.
7 SHEETS—SHEET 1.

Fig. 1.

INVENTOR
F. L. RAPSON

Fig. 2.

F. L. RAPSON.
LIFTING JACK AND THE LIKE FOR USE ON MOTOR ROAD AND OTHER VEHICLES.
APPLICATION FILED DEC. 22, 1917.

1,350,036.

Patented Aug. 17, 1920.
7 SHEETS—SHEET 5.

Fig. 9.

INVENTOR
F. L. RAPSON

UNITED STATES PATENT OFFICE.

FREDERICK LIONEL RAPSON, OF LIVERPOOL, ENGLAND.

LIFTING-JACK AND THE LIKE FOR USE ON MOTOR ROAD AND OTHER VEHICLES.

1,350,036.                    Specification of Letters Patent.    Patented Aug. 17, 1920.

Application filed December 22, 1917. Serial No. 208,497.

*To all whom it may concern:*

Be it known that I, FREDERICK LIONEL RAPSON, a subject of His Majesty the King of England, and resident of Liverpool, in the county of Lancaster, Kingdom of England, have invented certain new and useful Improvements in or Relating to Lifting-Jacks and the like for Use on Motor Road and other Vehicles, of which the following is a specification.

This invention relates to improvements in lifting jacks and the like for use on motor road and other vehicles.

The invention has for its object to provide on a motor road vehicle such as a motor car, means for lifting one or more of the wheels of a car from the ground, which means are adapted to be actuated by a hand wheel, lever or the like so that the weight of the car can be taken off each wheel separately or all of the wheels to relieve the tires when in the garage, or to jack the car up when it is desired to repair punctures or effect other repairs, or to raise the car for washing or inspection purposes.

A further object is to provide under the chassis of the vehicle and adjacent to each wheel a lever or lifting jack which will when operated through suitable mechanism by a handle or lever mounted preferably at the side of the car raise or lower the desired wheel or wheels in considerably less time than it would take to get the ordinary hand jack from the car.

A further object is to so construct the lifting means that they will be strong and quick in action, the car will be higher when in raised position, and the lifting means will occupy a small space when in the inoperative position.

A still further object is to provide shock absorbing means which will form a part of the jack and act as a spring check. It will be understood that the jack is permanently attached to the axle and therefore moves up and down with it, thus the shock absorbing portion of the jack will also act as a cushion or buffer during running of the vehicle and hold the wheels to the ground when driven over a rough or bumpy road.

A further object is to provide anti-friction means in the jack operating mechanism to enable the vehicle to be lowered or raised with the minimum effort.

With these and other objects in view the invention consists in providing adjacent to one or more of the wheels and to a convenient part of the chassis a pivoted lever or the like which is adapted to be actuated by a tie or coupling member or members connected to a sleeve or sleeves adapted to be moved along a rod by hand operated means so that the lower end of one or more of the levers will engage the ground and raise the vehicle when the sleeve or sleeves is or are moved in one direction, or the lower end of the said lever or levers will be drawn up and out of action when the sleeve or sleeves is or are moved in the opposite direction by the said hand operated means.

The invention will now be described with reference to the accompanying drawings in which :—

As shown more particularly in Figs. 1 to 5, a lever or the like 1 is pivoted adjacent to each wheel 2 of a motor car or other vehicle 3. Each lever 1 is preferably pivoted at its upper end as shown at 4 to a suitable bracket 5 which is secured in any suitable manner to the front or rear axle 6 adjacent to the spring 7 thereon. It will be understood that these levers 1 could be pivoted to any other part of the chassis or the frame 8 if so desired. Each lever 1 is pivotally connected by a suitably shaped tie bar or coupling rod or other suitable means 9 to an extension 11 of a sleeve or the like 10 which is adapted to ride on the screw threaded portion 12 of a shaft 13 rotatably mounted longitudinally under the chassis 8 and adjacent to each wheel 2. The outer end of each shaft 13 is carried in a bearing 14 through the medium of suitable anti-friction and thrust bearings 15 if so desired. The bearing 14 for the outer end of each shaft 13 is preferably formed in one with the bracket 5 for the pivoted lever 1. This bearing 14 and bracket 5 is substantially U shaped so that the bracket 5 for the lever 1 is disposed in front of the axle 6 just below the spring 7 secured thereon and the bearing 14 is disposed in a similar position at the rear or inner side of the axle 6. Each bearing 14 and bracket 5 is carried from the spring 7 by bolts 16 and plates 17 on the upper side thereof or the bearing and bracket could be carried by U shaped bolts disposed over the springs 7 as will be readily understood. The inner end of the shaft 13 is carried in a bearing 18 which is supported by a bracket 19 hung from the chassis 8 and this bearing 18 is preferably formed in one with another bearing 20 which is adapted to carry the inner end of a transversely disposed shaft 21. On the inner end of this latter shaft 21 is secured a bevel wheel 22 which is adapted to permanently engage with a bevel wheel 23 on the inner end of the longitudinal screwed shaft 13. The outer end of each transverse shaft 21 is supported by a bearing 24 disposed and carried under the running board 25 at the side of the car 3, and the outer end of this shaft 21 is provided with a squared hole or other suitably shaped end 26 for the reception of a detachable operating handle 27. The bearing 18 carrying the end of the longitudinal shaft 13 is preferably provided with a self-alining ball-race 28 to allow for the relative movement which occurs during normal running between the axle 6 and the bracket 19 on the frame 8. The bearings for the shafts 13 and 21 carrying the bevel gear wheels 22 and 23 are preferably formed in a cylindrical or cup shaped casing 29 of aluminium or other suitable material. This casing 29 is adapted to contain grease or other lubricant and keep the working parts free from dirt and mud. The cylindrical or cup shaped casing is provided with a bearing bushing 30 for the shaft 21 and the casing is formed with a lug for the bracket 19. The open end of the casing 29 is closed by a suitable cover 31. If desired, the casing 29 may be connected to the bracket 19 by means of a swivel.

Figure 1:
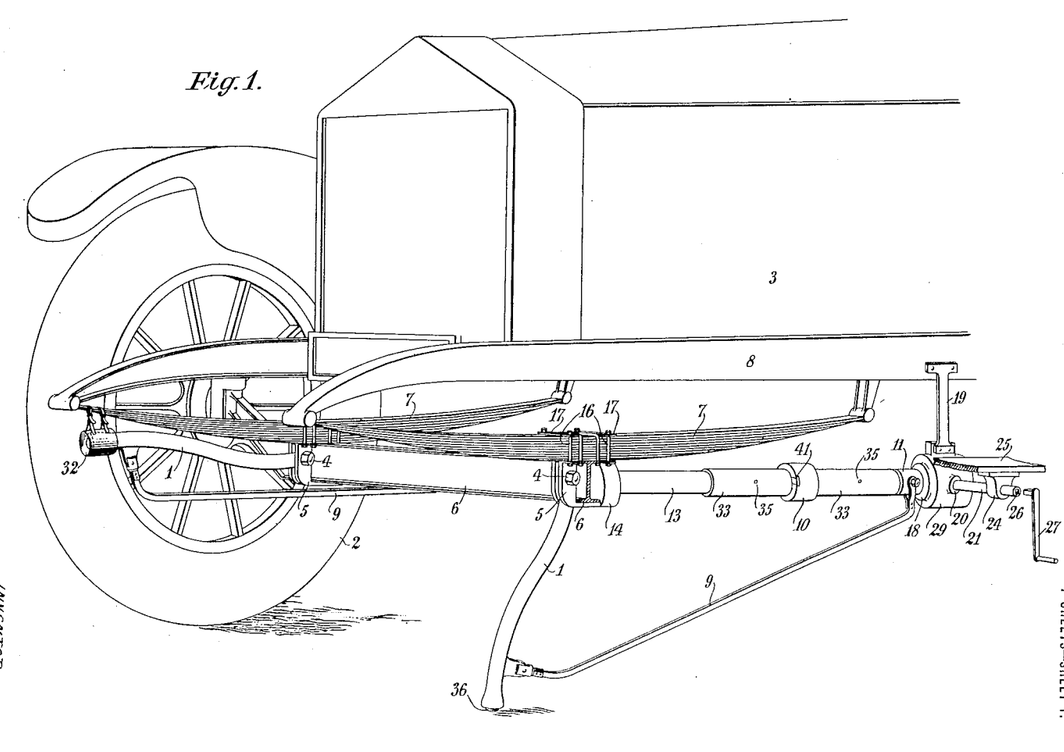
Figure 1 is a perspective view of one form of this invention showing one of the lever jacks lowered and the adjacent end of the axle raised, the wheel being removed for clearness.
Figure 2:
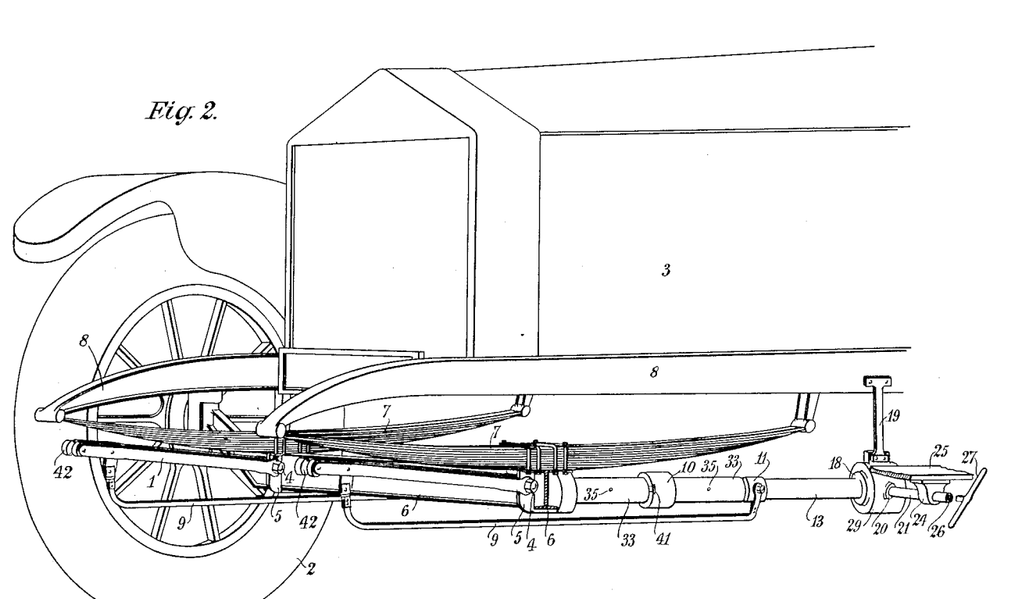
Fig. 2 is a similar view with the jack in its raised position and showing a modified form of lever jack leg and operating handle.
Figures 3, 4, 5, 6, 7:
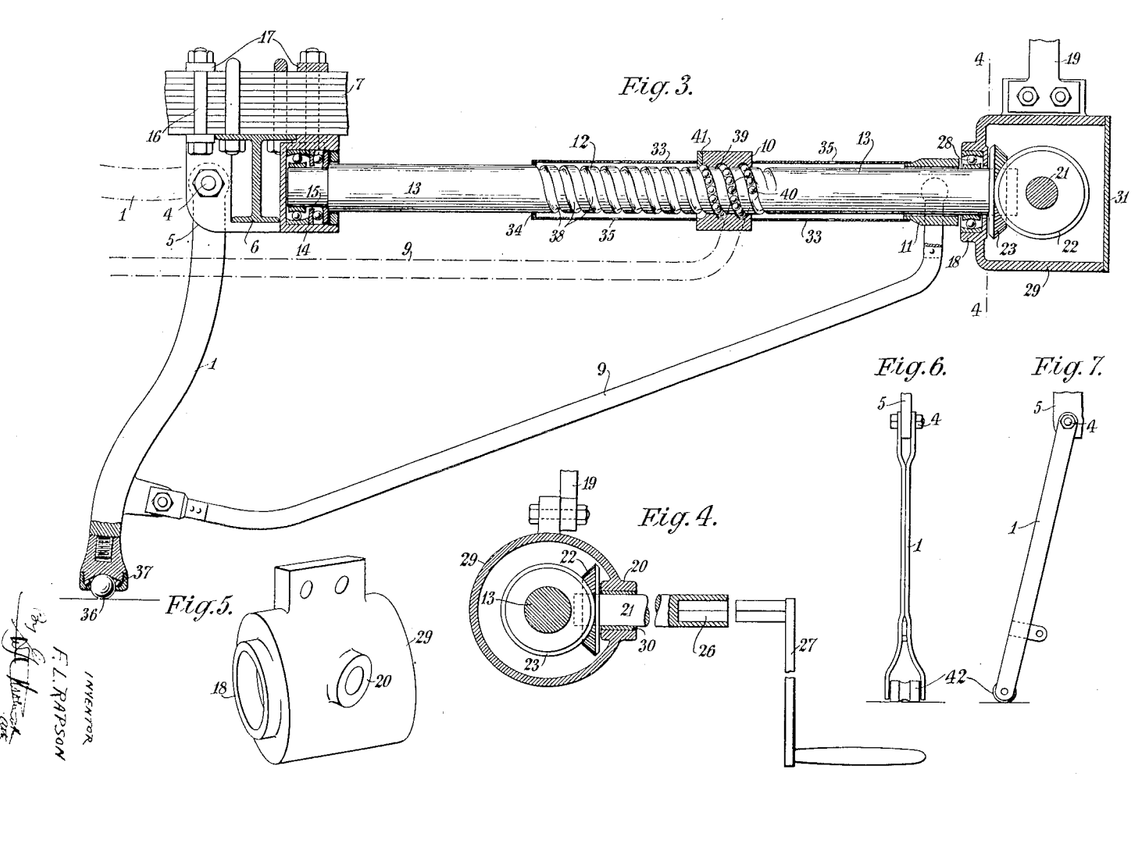
Fig. 3 is an enlarged sectional elevation of the jack raising and lowering mechanism showing the improved anti-friction screw arrangement.
Fig. 4 is a cross section taken on the line 4—4 of Fig. 3.
Fig. 5 is a perspective view of one form of cover for the operating gear.
Fig. 6 is a front elevation of the modified form of jack leg shown in Fig. 2.
Fig. 7 is a side elevation thereof.

In operation, such as in the event of a puncture to one of the tires the driver places the operating handle 27 in the squared hole 26 of the operating shaft 21 adjacent to the wheel having the punctured tire and turns the same. This movement rotates the transverse operating shaft 21 and the longitudinal shaft 13 is likewise rotated through the medium of bevel wheels 22 and 23. This motion will move the sleeve 10 inwardly along the screwed portion of the shaft 13 and likewise the extension 11 on the plain portion of the shaft 13 and pull the tie bar 9 so as to turn the jack lever 1 on its pivot 4 to a more vertical position so that its lower end will contact with the ground and raise the desired wheel therefrom so that the puncture can be attended to. When the tire is repaired the handle 27 is turned in the opposite direction to move the jack lever 1 back to its normal or raised position where it will be screened from view.

The outer ends of the lever jacks 1 when not in use may be kept clean and prevented from rattling by sliding over the said ends a gaiter or leather cover 32 which is strapped or otherwise connected to the wheel spring 7, the cover being similar to that usually provided for the starting handle, or a spring clip or the like may be provided on each spring 7 to engage with the outer or lower end of the said lever jack 1.

Suitable covers of leather or other suitable material may be provided to protect the working parts and prevent them being splashed with mud. In the present instance, tubular covers 33 of metal or the like such as aluminium are provided to inclose the threaded portion 12 of each shaft 13 and suitable leather or like packings 34 are also provided to prevent dirt entering the said tubular covers 33. Holes 35 may be provided in each cover to enable the threaded portion of the shaft 13 to be lubricated. The outer or lower end of each of the jack levers 1 is preferably fitted with a caster or ball 36 freely rotating on a suitable ball race 37 so that when the levers 1 engage the ground the car 3 can be easily moved or turned in any direction.

It will be understood that any form of thread may be provided on the shafts 13 and the sleeves 10 such as a V or squared thread but I preferably employ an anti-friction thread. In this case a helical semi-circular or substantially semi-circular groove or recess 38 is cut on the shaft 13 and in the sleeve 10 so that the opposed grooves form a race 39 circular in cross section, for the reception of steel or other anti-friction rollers or balls 40. In this manner the grooves 38 provide helical ball races 39 and the balls 40 form a complete anti-friction rolling helical screw thread so that when the shaft 13 is rotated in one direction or the other without longitudinal movement the sleeve or the like 10 is caused to freely move longitudinally thereon without friction. If desired, however, the threads and grooves may be made of other sectional shapes than those described.

In order to prevent the balls 40 from being ejected from the sleeve 10 a slidable dovetail member or stop 41 is fitted into a dovetail groove formed on each end of the said sleeve 10 so that the inner end of the said slide member 41 projects into the groove 38 in the shaft 13, thus the balls 40 are kept in position. The slides 41 will permit the balls 40 being placed in position within the grooves 38 or allow of their withdrawal without screwing the sleeve 10 off the end of the shaft 13. If desired, the sleeve may be divided so that the balls may be inserted therein, the divided portions being detachably secured together by screws or the like.

In Figs. 1 and 2 two separate jack elements are shown one for each front wheel but it will be understood that the rear wheels are also provided with separate jack legs, thus it will be seen that by lowering the four jacks 1 the car 3 can be bodily raised. Also the car when raised can be easily moved sidewise or in any direction on the freely rotating balls 36 provided on the ends of the levers 1. As it would be a mere matter of duplication to illustrate at the rear of the vehicle that which is illustrated at the front thereof, it is deemed unnecessary to duplicate at the rear of the vehicle that which is shown at the front thereof, because it is thought that the arrangement will be well understood by those skilled in the art, and that the way in which the car can be moved sidewise or in any direction on the rotating balls 36 at the lower ends of the levers 1 will be also understood by those skilled in the art.

If desired the levers 1 could be formed of flat bar metal and be provided at their lower ends with casters, rollers or the like 42 as shown in Figs. 2, 6 and 7.

Figure 8:
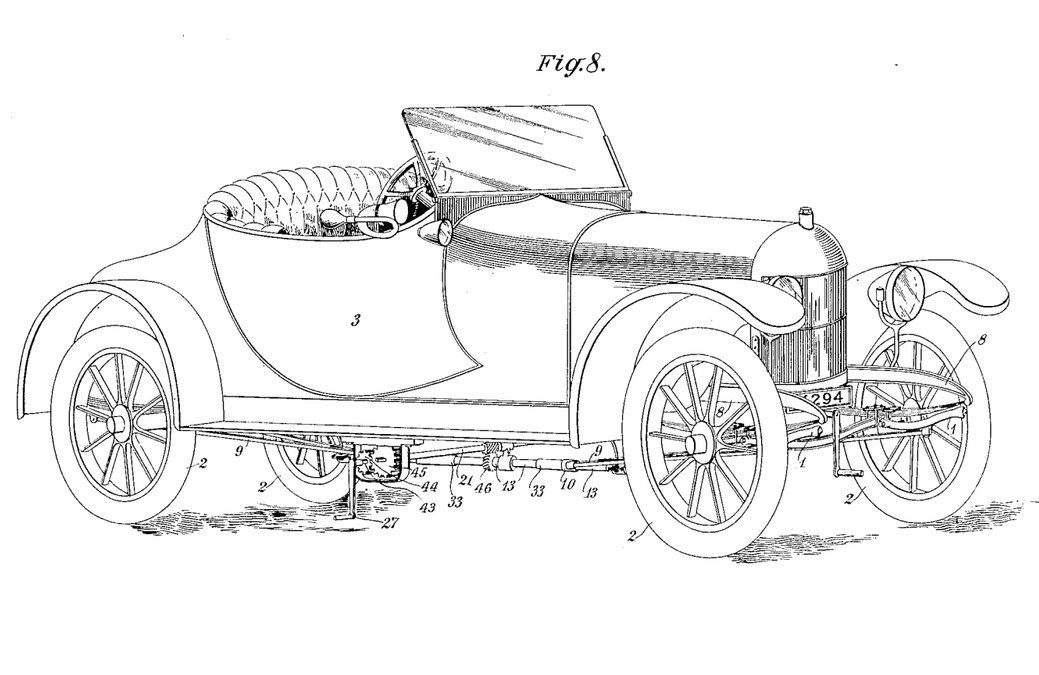
Fig. 8 is a perspective view of a modified form of the invention showing mechanism whereby the front and rear pair of lever jacks can be raised simultaneously.

In a further modified construction as shown in Fig. 8 the front tie bars or coupling rods 9 are connected to one sleeve 10 and the rear tie rods 9 are connected to another sleeve 10. These sleeves 10 are mounted on right and left handed screw threaded portions of a shaft 13 disposed longitudinally of the car 3 so that when this shaft 13 is rotated by a suitable hand wheel or handle 27 preferably at the side of the car 3 all the four lever jacks are raised or lowered simultaneously. The detachable operating handle 27 in this case is adapted to be placed on the squared end of a shaft 43 carrying a gear wheel 44 engaging with another gear wheel 45 on the transverse shaft 21. The inner end of this shaft 21 is connected through suitable gear 46 to the longitudinal shaft 13. This arrangement will be found to be very suitable for raising light cars bodily from the ground.

Figure 9:
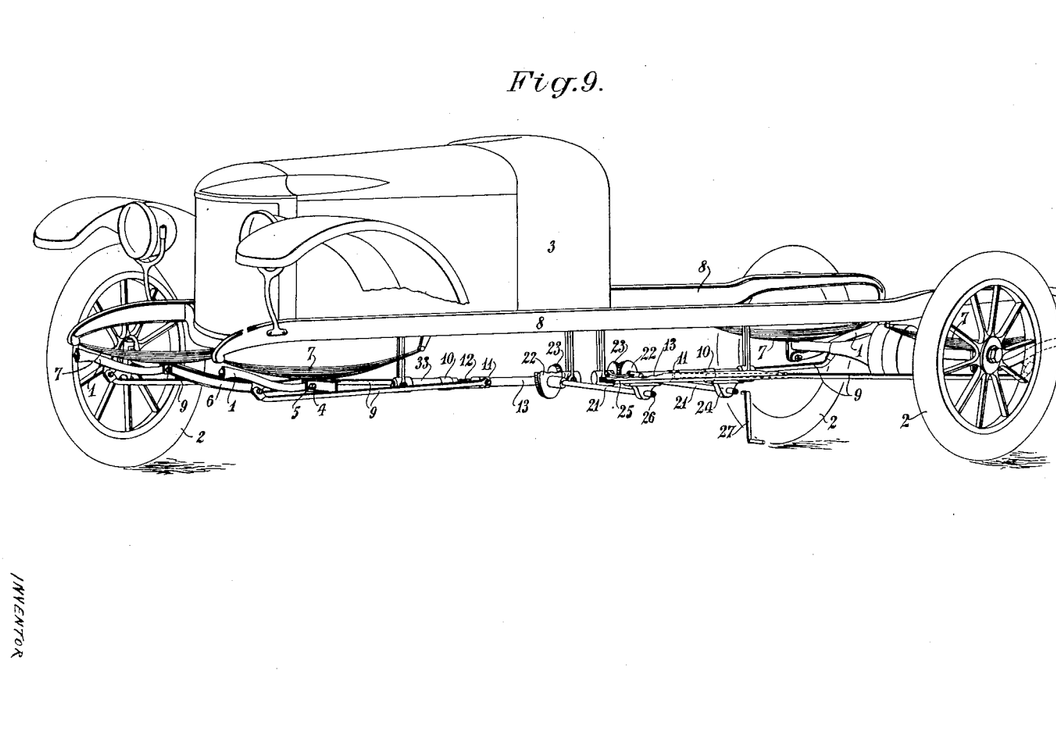
Fig. 9 is a similar view showing mechanism for raising or lowering the front or the rear jack legs independently.

In a further modification as shown in Fig. 9 the two front lever jacks 1 are connected to a sleeve 10 on one longitudinally disposed threaded shaft 13 and the two rear lever jacks 1 are connected to another sleeve 10 on another longitudinally disposed shaft so that the front or the rear of the car could be raised or lowered independently.

Figures 10, 15, 16, 17:
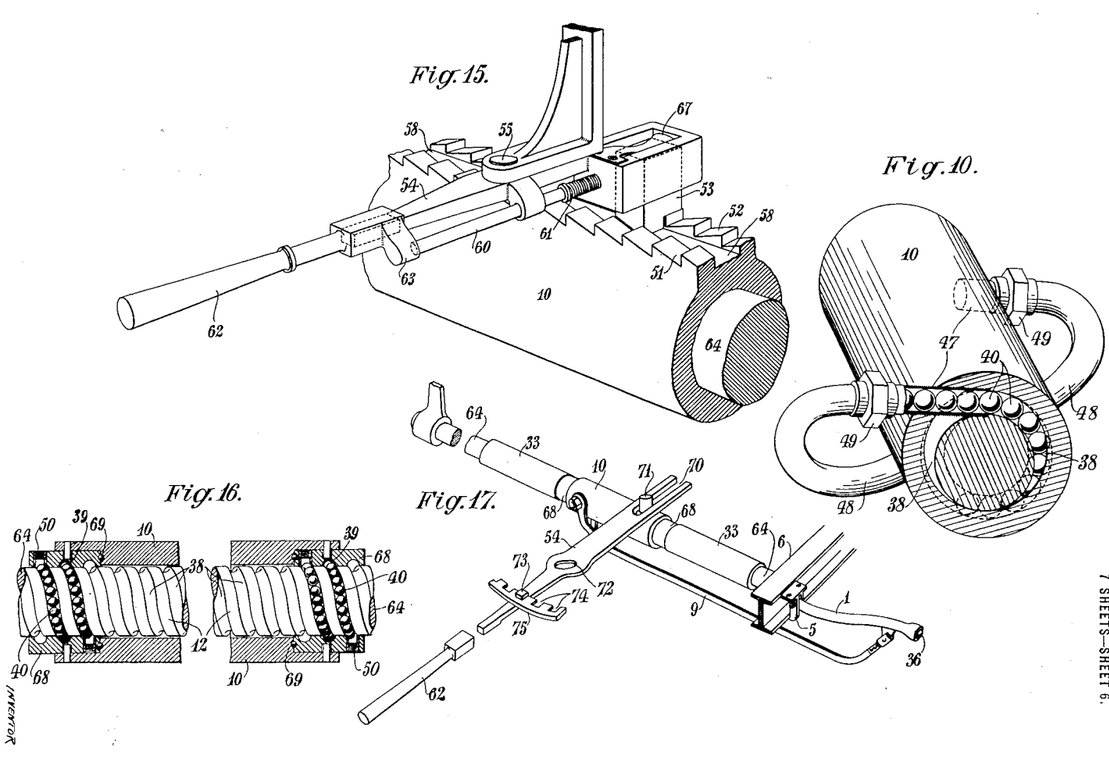
Fig. 10 is a sectional perspective view of one form of anti-friction device for the movable sleeve.
Fig. 15 is a perspective view of the operating lever and racks on the movable sleeve.
Fig. 16 is a sectional detail of the movable sleeve.
Fig. 17 is a perspective view of a further modified form of sleeve operating means.

In one suitable form of anti-friction device as shown in Fig. 10 a hole is drilled adjacent to each end of the sleeve 10 from the side thereof and extending into the two half grooves or recesses 38 preferably at a tangent thereto. Within each hole is inserted or screwed a short tube or pipe 47 of sufficient internal diameter to allow the balls 40 to freely pass therethrough. These two short tubes 47 are connected together by another tube 48 passing around the sleeve. This longer tube 48 is preferably connected to the shorter tubes 47 by unions or other suitable detachable means 49. In operation the balls 40 which are arranged in the grooves 38 between the stops or pipes 47 and in the communicating pipe 48, will be carried along the sleeve 10 as the shaft 13 is rotated and will pass through the said pipe 48. These balls 40 when the shaft 13 is rotated in one direction will pass from the front to the rear of the sleeve 10 and then through the communicating pipe 48 to the front end again. Thus a continuous movement of the balls 40 is assured. The movement of the balls 40 will be reversed when the shaft 13 is rotated in the opposite direction.

Figures 11, 12, 13, 14:
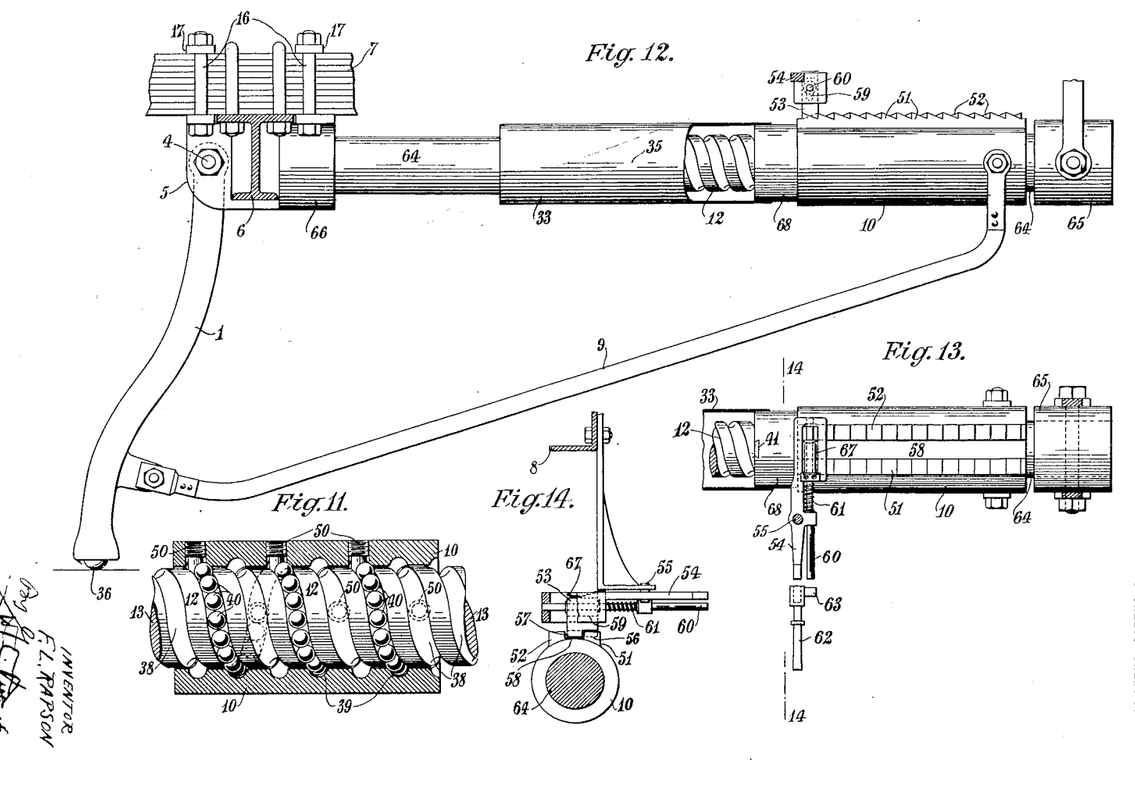
Fig. 11 is a sectional elevation of a modified form of anti-friction device.
Fig. 12 is a sectional side elevation of a modified form of sleeve operating means.
Fig. 13 is a plan thereof.
Fig. 14 is a cross section on the line 14—14 of Fig. 13.

In a modified construction as shown in Fig. 11, and when the sleeves 10 are of considerable length, the balls 40 are arranged in isolated sets. Each set of balls 40 of any suitable number is kept in its relative position by a suitable distance stop at each end of the said set, for instance, screws or the like 50 could be provided in the sleeve 10 so that their lower ends engage in the groove 38 formed on the shaft 13. If desired and as shown, the threaded holes for the screws 50 may be of such diameter as to permit the balls 40 to be placed into the grooves 38. Thus it will be seen that only a small number of balls 40 are required for a sleeve of considerable length. In an alternative arrangement the grooves 38 need only be provided with a small number of balls to allow of the free movement thereof or the grooves 38 need only be provided at the ends of the sleeve 10 so as to provide a set of balls at each end thereof. It will be seen that the spiral channel or groove 38 need only be cut in the center of the shaft 13; as the nut or sleeve 10 can be placed on the shaft and the balls 40 can be inserted when the sleeve 10 is in position; there is therefore no needless weakening of the shaft or waste of time in turning a long thread where a short one only is needed so far as traversing is concerned. It also makes protection from dirt easy.

It will be understood that the above described anti-friction screw gearing devices may be used in connection with any other mechanism or machinery such as lathes, training of guns—steering of automobiles or ships, planing machines or where it is desired to reduce the friction to a minimum. In some cases, when working under constant pressure or where the sleeve has to travel a long distance, the balls may be cooled and lubricated automatically by any suitable means.

In a still further modified construction as shown in Figs. 12 to 15 each sleeve 10 is provided with a pair of oppositely disposed toothed racks 51 and 52 which are adapted to be engaged by a pawl 53 slidably mounted in the end of a lever 54 pivoted at 55 in any suitable manner to the car frame or chassis 8. The pawl 53 is provided at its lower end with a pair of oppositely disposed rack engaging surfaces 56 and 57 to engage with the racks 51 and 52 respectively. Between the racks 51 and 52 is formed a groove 58 in which is adapted to ride the disengaged rack engaging surface of the pawl 53. The pawl 53 is provided with a slot 59 in which is mounted the end of a spring pressed rod 60. The spring 61 on this rod 60 is adapted to keep the rack engaging surface 56 normally in engagement with the rack 51. When it is desired to lower the car this rod 60 is adapted to be moved against the action of its spring 61 to slide the rack engaging surface 57 into engagement with the rack 52 when a detachable handle 62 is placed on the squared end of the lever 54. A suitable projection or lug 63 is provided on the handle 62 to engage the outer end of the rod 60. In operation and when it is desired to lower the jack legs the detachable handle 62 is placed on the end of the lever 54 so that the lug 63 on the said handle 62 is out of engagement with the end of the rod 60. The handle 62 can now be reciprocated to move the sleeve 10 by the rack engaging surface 56 of the pawl 53 engaging in the teeth of the rack 51. By this operation the lever or jack 1 will be lowered by the sleeve 10 being moved along a fixed shaft 64 which is secured at one end to the chassis by a bracket 65 and at the other end to the axle 6 by a bracket 66 formed in one with the bracket 5. Thus it will be seen that when the lever 54 is moved in one direction the rack 51 will be engaged and when moved in the other direction the pawl will override one or more of the teeth of the rack 51. A spring 67 is provided to depress the pawl 53 into engagement with the next adjacent tooth or teeth of the rack 51. When it is desired to raise the jack leg 1 back to its normal position the handle 62 is removed, inverted and again placed on the squared end of the lever 54 so that the lug 63 on this handle is adapted to engage the rod 60 to slide the pawl 53 along the aperture in the operating lever 54 so that the rack engaging surface 57 engages the rack 52 and the rack engaging surface 56 is disposed in the intermediate groove 58. Thus it will be seen that when the lever 54 is again reciprocated the sleeve 10 will be moved in the opposite direction and raise the jack leg 1 which is connected thereto by a coupling rod 9 as previously described. The sleeve 10 is preferably slidably mounted on the threaded portion 12 of the shaft 64 through the medium of another or a pair of rotatable sleeves 68 attached to the end or the ends thereof as shown more particularly in Fig. 16. These rotatable sleeves 68 which are connected to the sleeve 10 in any suitable manner and provided with thrust balls 69 are connected to the shaft through the medium of the previously described anti-friction screw device so that the jack leg will be held while the lever 54 is brought into position to engage the next rack or ratchet tooth.

In a slightly modified form as shown in Fig. 17 the lever 54 is provided with an inner forked end 70 to engage with an upwardly projecting pin 71 on the sleeve 10. The lever 54 which is adapted to be operated by a detachable handle 62 is preferably pivoted by means of a swivel at 72 to the chassis frame 8 and provided with a projection 73 to engage in one of a series of teeth 74 formed in a quadrant 75 mounted under the foot-board so that the lever 54 can be locked in any desired position.

What I claim is:—

1. In a lifting jack for vehicles, a chassis, a lever pivoted on the chassis, shaft journaled on the chassis and provided with a spiral groove, a sleeve slidable on the shaft and provided with an internal spiral groove coinciding and coöperating with the groove in the shaft to form a spiral race-way, balls mounted in the race-way, a second sleeve slidable on the shaft, a tubular connection between said sleeves and arranged in embracing relation with said shaft, a connection between the second mentioned sleeve and said lever, and means to slide the sleeves on the shaft whereby to raise and lower the lever.

2. In a lifting jack for vehicles, a chassis, a lever pivoted on the chassis, a horizontally disposed shaft journaled on the chassis and provided with a spiral groove, a sleeve slidable on the shaft and provided with an internal spiral groove adapted to coincide and coöperate with the spiral groove in said shaft to form a race-way, balls mounted in the race-way, a second sleeve slidable on the shaft in spaced relation to the aforesaid sleeve, a tubular connection between said sleeves, the tubular connection embracing said shaft, a connection between the second mentioned sleeve and the lower end of said lever, and a gear mechanism operatively connected with the shaft to rotate the latter and slide said sleeves so as to raise and lower said lever.

3. In a lifting jack for vehicles, a chassis, a lever pivotally suspended from the chassis, a casing suspended from the chassis, a shaft mounted on the chassis and extending into said casing, the shaft having a spiral groove formed therein, a sleeve slidable on the shaft and provided with an integral groove to coact with the spiral groove of the shaft to form a race-way, balls arranged in the race-way, a second sleeve slidable on the shaft, a connection between said sleeves, a connection between the second mentioned sleeve and the lever, and a gear mechanism confined within said casing and operatively connected to said shaft to rotate the latter and slide said sleeves to raise and lower the lever.

4. In a lifting jack for vehicles, a chassis, a lever pivotally connected with the chassis, a horizontally disposed shaft journaled on the chassis and provided with a spiral groove, a relatively short sleeve mounted on the shaft and provided with an internal groove to coact with the spiral groove of the shaft to form a spiral race-way, balls arranged in the race-way, a second sleeve slidable on the shaft, a tubular member embracing the shaft and connecting said sleeves, a second tubular member having connection with the first mentioned sleeve and embracing the shaft, said sleeves coacting with the relatively short sleeve to confine the grooves of the shaft within the same, a connection between the second mentioned sleeve and the lever, and means for rotating the shaft to slide the sleeves and tubular members along the shaft and thereby raise and lower the lever.

5. In a lifting jack for vehicles, a chassis, a lever pivotally connected with the chassis, a horizontally disposed shaft journaled on the chassis and provided with a spiral groove, a relatively short sleeve mounted on the shaft and provided with an internal groove to coact with the spiral groove of the shaft to form a spiral race-way, balls arranged in the race-way, a second sleeve slidable on the shaft, a tubular member embracing the shaft and connecting said sleeves, a second tubular member having connection with the first mentioned sleeve and embracing the shaft, said sleeves coacting with the relatively short sleeve to confine the grooves of the shaft within the same, a connection between the second mentioned sleeve and the lever, and an inclosed gear mechanism operatively connected to the shaft to rotate the latter and thereby shift the sleeves and tubular members along the shaft to raise and lower the lever.

6. In a lifting jack for vehicles, a chassis, a lever pivoted at its inner end to the chassis, a shaft arranged horizontally on the chassis and provided with a spiral groove intermediate its ends, a sleeve slidable on the shaft and provided with an internal spiral groove coinciding and coöperating with the groove in the shaft to form a spiral race-way, balls mounted in the race-way, a second sleeve slidable on the shaft in spaced relation to the aforesaid sleeve, a tubular member embracing the shaft and connecting said sleeves, and a downwardly substantially inclined connection between the second sleeve and the lower end of said lever, and means to slide the sleeves on the shaft to raise and lower the lever and the connection between the second sleeve and the lever.

In testimony whereof I have hereunto signed my name.

FRED. LIONEL RAPSON.